United States Patent [19]

Jonsson et al.

[11] Patent Number: 5,414,054
[45] Date of Patent: May 9, 1995

[54] COPOLYCARBONATE HAVING IMPROVED LOW-TEMPERATURE IMPACT STRENGTH

[75] Inventors: Erik H. Jonsson, Pittsburgh; Rick L. Archey, Pleasant Hills; Robert J. Kumpf; Aaron D. Meltzer, both of Pittsburgh, all of Pa.; Harald Pielartzik, Krefeld, Germany; Raymond A. Yourd, Pittsburgh, Pa.

[73] Assignee: Miles Inc., Pittsburgh, Pa.

[21] Appl. No.: 252,295

[22] Filed: Jun. 1, 1994

[51] Int. Cl.$^6$ .................... C08G 63/61; C08G 63/695
[52] U.S. Cl. ................................. 525/439; 525/446; 525/464
[58] Field of Search .............. 525/464, 439, 446; 528/26, 29, 17, 18

[56] References Cited

U.S. PATENT DOCUMENTS

| | | | |
|---|---|---|---|
| 3,189,662 | 6/1965 | Vaughn, Jr. | 260/824 |
| 3,419,634 | 12/1968 | Vaughn, Jr. | 260/824 |
| 4,123,588 | 10/1978 | Molari, Jr. | 428/412 |
| 4,569,970 | 2/1986 | Paul et al. | 525/67 |
| 4,657,989 | 4/1987 | Evans | 525/464 |
| 4,920,183 | 4/1990 | Evans et al. | 525/464 |
| 4,994,532 | 2/1991 | Hawkins et al. | 525/464 |
| 5,068,302 | 11/1991 | Horlacher et al. | 528/21 |
| 5,179,142 | 1/1993 | Ono et al. | |

FOREIGN PATENT DOCUMENTS 2-029455 1/1990 Japan.

Primary Examiner—Ralph H. Dean
Attorney, Agent, or Firm—Joseph C. Gil; Aron Preis

[57] ABSTRACT

A thermoplastic copolycarbonate resin having improved low temperature impact strength and a process for the preparation of the resin are disclosed. Accordingly the structure of the copolycarbonate contains
(i) units of the formula

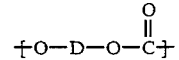

wherein D is a divalent residue of a dihydroxy compound, and
(ii) units of the formula

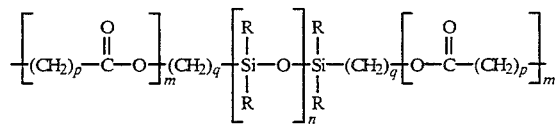

wherein m is 1–90, n is 5–300, R is an alkyl or a phenyl radical p is 2–12 and q is 2–20. The preparation of the copolycarbonate entails reactive blending of polycarbonate with a suitable lactone siloxane copolymer in the presence of a transesterification catalyst.

11 Claims, No Drawings

COPOLYCARBONATE HAVING IMPROVED LOW-TEMPERATURE IMPACT STRENGTH

FIELD OF THE INVENTION

The invention concerns thermoplastic molding resins and more particularly copolymeric resins which contain structural units derived from caprolactone-co-siloxanes.

SUMMARY OF THE INVENTION

A thermoplastic copolycarbonate resin having improved low temperature impact strength and a process for the preparation of the resin are disclosed. Accordingly the structure of the copolycarbonate contains
(i) units of the formula

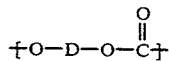

wherein D is a divalent residue of a dihydroxy compound, and
(ii) units of the formula

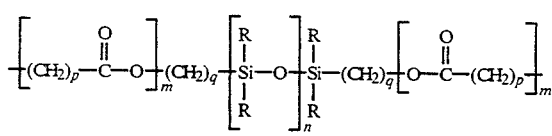

wherein m is 1–90, n is 5–300, R is an alkyl or a phenyl radical p is 2–12 and q is 2–20. The preparation of the copolycarbonate entails reactive blending of polycarbonate with a suitable lactone siloxane copolymer in the presence of a catalyst.

BACKGROUND OF THE INVENTION

Polycarbonate resins are well-known thermoplastic resins which have long been used in a variety of applications requiring resistance to impact. At low temperatures, generally lower than 20° C., polycarbonate becomes brittle and its utility is thus limited by this shortcoming. It is known that the low temperature impact strength of polycarbonate may be improved upon by the introduction (by copolymerization) of silicone blocks into the carbonate structure. U.S. Pat. Nos. 3,189,662; 3,419,634; 4,123,588; 4,569,970; 4,920,183 and 5,068,302 are noted to disclose relevant copolymers.

Relevant copolymers have been prepared in accordance with a melt blending process disclosed in U.S. Pat. No.4,994,532. The process entails melt blending an aromatic polycarbonate resin and a polydiorganosiloxane having at least one functional carboxylic acid group. Also relevant in the present context is U.S. Pat. No. 4,657,989 which disclosed a preparation method where siloxane compound is reacted with polycarbonate, wherein at least one of the reactants is anionic and the other being reactive with nucleophiles.

DETAILED DESCRIPTION OF THE INVENTION

The inventive copolycarbonate contains
(i) structural units of the formula

wherein D is a divalent residue of a dihydroxy compound (residue in the present context refers to the structure of the compound less its hydroxy groups) and
(ii) structural units of the formula

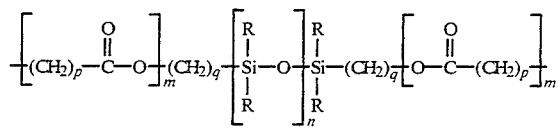

wherein m is 1–90, n is 5–300, R is an alkyl or a phenyl radical p is 2–12 and q is 2–20.

The preparation of the copolycarbonate of the invention entails reactive blending of a polycarbonate resin with a lactone-siloxane block copolymer in the presence of a suitable catalyst.

The term "reactive blending" as used in the present context refers to a homogeneous admixing of the polycarbonate resin and the lactone-siloxane block copolymer in the molten state, that is in the state where these resins are in a thermoplastic state-heated to a condition of plasticity whereupon the resins flow like a fluid. Typically the temperature is within a range to cause reaction between the polycarbonate and the lactone-siloxane block copolymer, generally in the range of 200° C. to 350° C., preferably 250° C. to 320° C.

Suitable polycarbonate resins for preparing the copolymer of the present invention are homopolycarbonates and copolycarbonates and mixtures thereof.

The polycarbonates generally have a weight average molecular weight of 10,000–200,000, preferably 20,000–80,000 and their melt flow rate, per ASTM D-1238 at 300° C., is about 1 to about 65 gm/10 min., preferably about 2–15 gm/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; an monograph by H. Schnell, "Chemistry and Physics of Polycarbonates", Interscience Publishers, New York, New York, 1964, all incorporated herein by reference).

In the present context, dihydroxy compounds suitable for the preparation of the polycarbonates of the invention conform to the structural formulae (1) or (2).

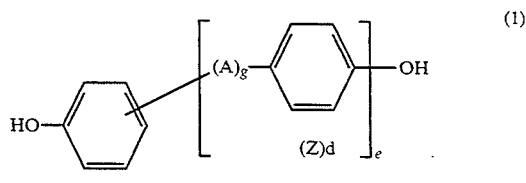

and

-continued

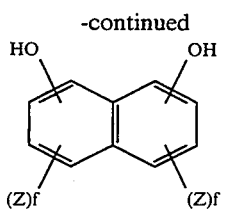

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO—or—SO$_2$ or a radical conforming to

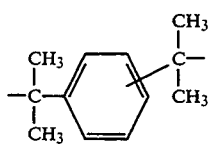

e and g both denote the number 0 to 1;

Z denotes F, Cl, Br or C$_1$–C$_4$-alkyl and if several Z radicals are substituents in one aryl radical, they may be identical or different from one another;

d denotes an integer of from 0 to 4; and f denotes an integer of from 0 to 3.

Among the dihydroxy compounds useful in the practice of the invention are hydroquinone, resorcinol, bis-(hydroxyphenyl)-alkanes, bis(hydroxyphenyl)-ethers, bis-(hydroxyphenyl)-ketones, bis-(hydroxyphenyl)sulfoxides, bis-(hydroxyphenyl)-sulfides, bis-(hydroxyphenyl)-sulfones, and α,α-bis-(hydroxyphenyl)-diisopropyl-benzenes, as well as their nuclear-alkylated compounds. These and further suitable aromatic dihydroxy compounds are described, for example, in U.S. Pat. Nos. 5,105,004; 5,126,428; 5,109,076; 5,104,723; 5,086,157; 3,028,356; 2,999,835; 3,148,172; 2,991,273; 3,271,367; and 2,999,846, all incorporated herein by reference.

Further examples of suitable bisphenols are 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5 -dimethyl-4-hydroxphenyl)-methane, 2,2-bis-(3,5 -dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxy-phenyl)-sulfone, dihydroxybenzophenone, 2,4-bis-(3,5-dimethyl-4-hydroxyphenyl)-cyclohexane, α,α'-bis-(3,5-dimethyl-4-hydroxyphenyl)-p-diisopropylbenzene and 4,4'-sulfonyl diphenol.

Examples of particularly preferred aromatic bisphenols are 2,2,-bis-(4-hydroxyphenyl)-propane, 2,2-bis-(3,5-dimethyl-4-hydroxphenyl)propane and 1,1 -bis-(4-hydroxyphenyl)-cyclohexane.

The most preferred bisphenol is 2,2-bis-(4-hydroxyphenyl)propane (bisphenol A).

The polycarbonates of the invention may entail in their structure units derived from one or more of the suitable bisphenols.

Among the resins suitable in the practice of the invention are phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05 –2.0 mol % (relative to the bisphenols) of polyhydroxyl compounds.

Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxyl compounds which may be used for this purpose: phloroglucinol; 4,6-dimethyl-2,4,6-tri-(4-hydroxyphenyl)-heptane; 1,3,5-tri-(4-hydroxphenyl)-benzene; 1,1,1 -tri-(4hydroxyphenyl)-ethane; tri-(4-hydroxyphenyl)-phenylmethane; 2,2-bis-[4,4(4,4'-dihydroxydiphenyl)]-cyclohexyl-propane; 2,4-bis-(4-hydroxy-1-isopropylidine)-phenol; 2,6-bis-(2'-dihydroxy-5'-methylbenzyl)-4-methylphenol; 2,4-dihydroxybenzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxy-benzoic acid, trimesic acid, cyanuric chloride and 3,3-bis-(4-hydroxyphenyl)2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by references, U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, Makrolon FCR, Makrolon 2600, Makrolon 2800 and Makrolon 3100, all of which are bisphenol based homopolycarbonate resins differing in terms of their respective molecular weights and characterized in that their melt flow indices (MFR) per ASTM D-1238 are about 16.5–24, 13–16, 7.5–13.0 and 3.5–6.5 gm/10 min., respectively. These are products of Miles Inc. of Pittsburgh, Pa.

A polycarbonate resin suitable in the practice of the invention is known and its structure and methods of preparation have been disclosed, for example in U.S. Pat. Nos. 3,030,331; 3,169,121; 3,395,119; 3,729,447; 4,255,556; 4,260,731; 4,369,303 and 4,714,746 all of which are incorporated by reference herein.

The lactone-siloxane block copolymer suitable in the present context is preferably a block copolymer having a structure conforming to

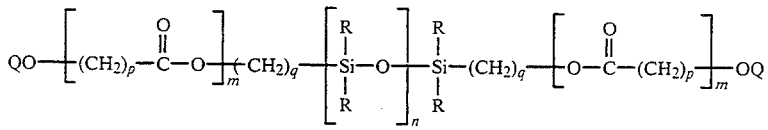

where m is 1–90, preferably 1–50, n is 5–300, preferably 10–160,

R denotes a substituted or an unsubstituted $C_1$–$C_{20}$ alkyl or a phenyl radical, preferably methyl, Q denotes H, $C_1$–$C_4$ alkyl or a substituted alkyl group, a hydrocyclic or substituted hydrocyclic group, an aromatic or substituted aromatic group, a benzylic or substituted benzylic group or a silyl or substituted silyl group, p is 2 to 12, preferably 2,4 or 5, and q is 2–20, preferably 6 –10.

In preparing the copolymer of the present invention it is important that the length of the lactone block should be kept at a minimum, however too short a length gives rise to incompatibility between the lactone-siloxane polymer and the polycarbonate resin which in turn gives rise to an excessively slow rate of reaction. While the slow reaction rate may be reconciled by increasing the amount of catalyst, this in turn has an adverse effect on the properties of the final product. Best results were obtained in instances where the dimethyl siloxane block length is of about 50 repeating units and the caprolactone block has about 9 repeating units.

In preparing the copolycarbonate of the invention it is important that the amount of siloxane in the final product will be about 0.05 to 30, preferably 0. 1 to 20 and most preferably about 1 to 10 percent relative to the weight of the copolycarbonate.

In preparing the copolycarbonate of the invention the amount of catalyst used in the course of the melt blending is about 5 to 1000 ppm, preferably 25 to 500 ppm and most preferably 50 to 200 ppm, based on the weight of the resulting copolycarbonate.

Suitable catalysts are the known transesterification catalysts which are stable at temperatures above 200° C, including the titanium, tin, Zinc, antimony and lead compounds which are known in the art for their catalytic effect. Special mention would be made of titanium (IV) butoxide, tetrakis(2-ethylhexyl)titanate, tin(IV) oxide, dibutyl tin oxide, dioctyltin oxide, dibutyl tin dilaurate, dioctyltin dilaurate, butyltin hydroxide oxide, octyltin hydroxide, zinc(IV) oxide, zinc (11) oxide, lead phenolate and lead acetate.

Forming the composition of the invention may be accomplished by any conventional melt blending technique, including a thermoplastic extruder, preferably a twin screw extruder, where the reactants are heated to a melt temperature and thoroughly mixed in the presence of a catalyst to effect a reaction.

In carrying out the preparation of the copolycarbonate of the invention the polycarbonate resin is introduced into an extruder, preferably a twin screw extruder, and the lactone-siloxane copolymer is either mixed with the polycarbonate resin and introduced via the feeder or melted and pumped with a suitable pump, preferably a gear pump, to a down stream addition port of the extruder. The catalyst may be added either (i) together with the polycarbonate resin in the feeder or (ii) dispersed into the melted lactone-siloxane copolymer and pumped into the extruder or (iii) dissolved in a suitable solvent, for instance, methylene chloride, chloroform and tetrachloroethane, mixed with the lactone-siloxane copolymer and then pumped into the extruder. The extrusion and pelletizing are carried out following known methods; a vacuum of about 20–25 inches of water was applied during the extrusion step. The extrusion process parameters, measured on a ZSK-30 twin screw extruder, are normally as follows: melt temperature 200°–350° C., preferably 250°–320° C., screw speed 5–700 rpm, preferably 100–600 rpm, most preferably 300–500 rpm.

Experimental

Compositions in accordance with the present invention have been prepared and their properties determined as summarized in the following tables. In the preparation of the compositions use was made of Makrolon 3208 homopolycarbonate resin, a commercial product of Miles Inc., having a melt flow index of 4 g/10 min. in accordance with ASTM D-1238. The lactone-siloxane used in the course of the experiments is described generically as

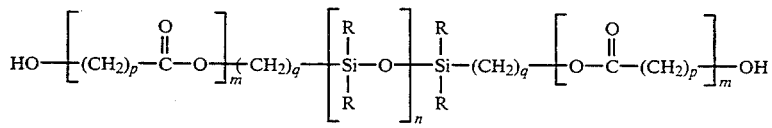

In the table below, T-1 refers to a specie of the generic compound where n=30 and m=18, the corresponding values for the compound labeled T-2 are: n=50 and m=9, and the values for T-3 are: n=50 and m=18. In all three compounds, R denotes a methyl group, p=5 and q=6.

The preparation method noted in the tables relates to the introduction of the catalyst as follows:

MIX denotes mixing the catalyst with the polycarbonate base resin,

DSP denotes dispersing the catalyst into the melted caprolactone siloxane copolymer and pumping into the extruder and DIS denotes dissolving the catalyst in a solvent, mixing with the siloxane and pumping into the extruder.

In all the examples, the amount of siloxane in the copolycarbonate was adjusted to 5% by weight, based on the amount of siloxane repeat unit.

TABLE 1

| (caprolactone-siloxane T-1) | | | | | |
|---|---|---|---|---|---|
| | 1 | 2 | 3 | 4 | 5 |
| catalyst used* | Ti | Ti | DB | DB | DB |
| amount of catalyst, ppm | 500 | 500 | 500 | 500 | 500 |
| preparation method** | MIX | MIX | DSP | DSP | DSP |
| melt temperature, °C. | 320 | 320 | 270 | 270 | 270 |
| screw speed, rpm | 400 | 100 | 250 | 150 | 400 |
| melt flow rate g/10 min. | 21.8 | 17.5 | 12.1 | 10.8 | 25.6 |
| melt flow temperature, °C. | 300 | 300 | 250 | 250 | 250 |
| Heat Distortion Temperature, °C. | 106.6 | 113.2 | 99.1 | 100.5 | 94.8 |
| Impact strength, ft-lb/in. | | | | | |
| ⅛″ | 12.3 | 16.2 | 6.8 | 7.3 | 5.4 |
| ⅛″ @ −40° C. | 2.7 | 2.9 | — | — | 3.6 |
| ¼″ | 10.1 | 11.7 | 1.8 | 3.6 | 1.7 |
| ¼″ @ −40° C. | 3.0 | 3.2 | — | — | 3.7 |
| Tensile properties | | | | | |
| Yield, kpsi | 8.8 | 9.0 | 8.9 | 8.8 | 8.7 |
| strength at break, kpsi | 7.0 | 8.3 | 5.7 | 6.5 | 6.4 |
| yield, % | 67 | 100 | 6 | 26 | 16 |
| Flexural properties | | | | | |
| Modulus, kpsi | 331.1 | 341.0 | 332.5 | 328.1 | 335.6 |
| strength, kpsi | 12.6 | 12.9 | 13.0 | 12.8 | 13.0 |

*Ti denotes titanium(IV)butoxide and DB denotes dibutyl tin oxide.

The results of further experiments are shown below in table 2. In the preparation of the compositions 6, 7 and 8 the caprolactone-siloxane used was T-2 while the caprolactone -siloxane T-3 was used in the preparation of composition 9 and 10. The catalyst used in the preparation of all the compositions below was dibutyl tin oxide.

TABLE 2

| | 6 | 7 | 8 | 9 | 10 |
|---|---|---|---|---|---|
| amount of catalyst, ppm | 200 | 160 | 160 | 50 | 100 |
| preparation method** | DIS | DIS | DIS | DIS | DIS |
| melt temperature, °C. | 310 | 315 | 315 | 295 | 295 |
| screw speed, rpm | 500 | 400 | 500 | 400 | 500 |
| melt flow rate g/10 min. | 4.1 | 8.6 | 9.0 | 12.0 | 11.7 |
| melt flow temperature, °C. | 250 | 270 | 270 | 250 | 250 |
| Heat Distortion Temperature, °C. | 109.8 | 109.5 | 110.5 | 106.5 | 108.4 |
| Impact strength, ft-lb/in. | | | | | |
| ⅛″ | 16.5 | 14.7 | 15.6 | 12.5 | 12.2 |
| ⅛″ @ −40° C. | 11.3 | 4.5 | 5.7 | 4.8 | 5.6 |
| ¼″ | 11.5 | 10.9 | 11.5 | 10.6 | 9.6 |
| ¼″ @ −40° C. | 5.4 | 3.9 | 4.3 | 5.1 | 4.9 |
| Tensile properties | | | | | |
| Yield, kpsi | 8.7 | 8.7 | 8.5 | 8.4 | 8.4 |
| strength at break, kpsi | 7.7 | 6.6 | 8.0 | 6.6 | 6.6 |
| yield, % | 106 | 67 | 113 | 83 | 76 |
| Flexural properties | | | | | |
| Modulus, kpsi | 334.2 | 326.5 | 323.2 | 348.8 | 350.3 |
| strength, kpsi | 12.8 | 12.0 | 11.9 | 12.9 | 12.8 |

The copolymers prepared in accordance with the present invention were characterized by means of e.g., NMR-Spectroscopy and size exclusion chromatography equipped with FT-IR detector. In the course of the work leading up to the present invention comparative experiments were conducted in much the same way as above except that no catalysts were added. In all these comparative experiments the extruded material was inhomogeneous due to incomplete reaction. Attempts to injection mold the material failed.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic copolycarbonate resin the structure of which comprise (i) units of the formula

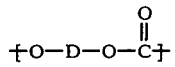

wherein D is a divalent residue of a dihydroxy compound, and (ii) units of the formula

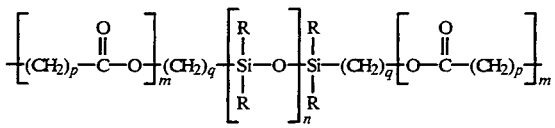

wherein m is 1-90, n is 5-300, R is an alkyl or a phenyl radical p is 2-12 and q is 2-20.

2. The thermoplastic copolycarbonate resin of claim 1 wherein said n is about 10-160.

3. The thermoplastic copolycarbonate resin of claim 1 wherein said R is a methyl group.

4. The thermoplastic copolycarbonate resin of claim 1 wherein said p is 2,4 or 5.

5. The thermoplastic copolycarbonate resin of claim 1 wherein said q is 6 to 10.

6. The thermoplastic copolycarbonate resin of claim 1 wherein said n is about 10-160, R is a methyl group, p is 2,4, or 5 and q is 6 to 10.

7. The thermoplastic copolycarbonate resin of claim 1 wherein said D is a residue of a dihydroxy compound selected from compounds conforming to formulae (1) or (2).

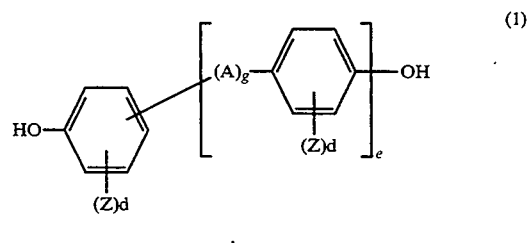

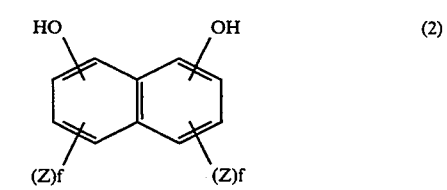

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO₂ or a radical conforming to

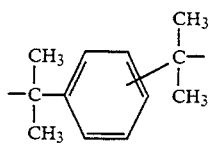

e and g both denote the number 0 to 1;

Z denotes F, Cl, Br or $C_1$-$C_4$-alkyl and if several Z radicals are substituents in one aryl radical, they may be identical or different from one another;

d denotes an integer of from 0 to 4; and f denotes an integer of from 0 to 3.

8. A process for preparing a copolycarbonate comprising reacting in the presence of a transesterification catalyst (i) a polycarbonate resin and (ii) a lactone-siloxane block copolymer conforming to

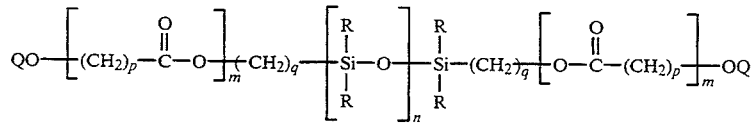

wherein m is 1-90, n is 5-300, R denotes a substituted or an unsubstituted $C_1$-$C_{20}$-alkyl or a phenyl radical, Q denotes hydrogen atom or member selected from the group consisting of $C_1$-$C_4$ alkyl group, hydrocyclic group, aromatic group, benzylic group and silyl group, p is 2 to 12, and q is 2-20.

9. The process of claim 8 wherein said group is substituted.

10. The process of claim 8 wherein said R denotes $C_{1-20}$ alkyl, m is 1-50, n is 10-160, Q denotes H, p is 2,4 or 5 and q is 6-10.

11. The process of claim 8 wherein said catalyst is a member selected from the group consisting of titanium (IV) butoxide, tetrakis(2-ethylhexyl)titanate, tin(IV) oxide, dibutyl tin oxide, dioctyltin oxide, dibutyl tin dilaurate, dioctyltin dilaurate, butyltin hydroxide oxide, octyltin hydroxide, zinc(IV) oxide, zinc (II) oxide, lead phenolate and lead acetate.

* * * * *